United States Patent [19]

Miller

[11] 4,426,893
[45] Jan. 24, 1984

[54] HIGH PRODUCTION SERRATOR

[75] Inventor: Stewart F. Miller, Mt. Clemens, Mich.

[73] Assignee: Lear Siegler, Inc., Santa Monica, Calif.

[21] Appl. No.: 144,457

[22] Filed: Apr. 28, 1980

[51] Int. Cl.³ .............................................. B21K 5/20
[52] U.S. Cl. ..................................... 76/1; 76/101 A; 409/47; 409/58; 407/27
[58] Field of Search ..................... 76/101 A, 107 R, 4, 76/1; 409/47, 80, 2, 58, 327, 325, 347, 333, 332; 407/20, 27

[56] References Cited

U.S. PATENT DOCUMENTS

| | | | |
|---|---|---|---|
| 1,978,924 | 10/1934 | Wildhaber | 409/47 |
| 2,164,642 | 7/1939 | Drader | 407/27 |
| 2,168,932 | 8/1939 | Drummond | 76/107 R |
| 2,169,632 | 8/1939 | Drummond | 76/101 A |
| 2,880,653 | 4/1959 | Feld et al. | 409/347 |
| 2,882,798 | 4/1959 | Bengi et al. | 409/31 |
| 3,300,833 | 1/1967 | Daniel | 407/27 |
| 3,335,639 | 8/1967 | Daniel | 76/107 R |

*Primary Examiner*—Roscoe V. Parker
*Attorney, Agent, or Firm*—Whittemore, Hulbert & Belknap

[57] ABSTRACT

A machine for serrating the flanks of the teeth of a gear-like tool for shaving gears in which a generating, relative motion equivalent to rolling the tool on a rack is provided and in which one of a plurality of serrating tools are positioned for cutting serrations in the flanks of the teeth.

10 Claims, 6 Drawing Figures

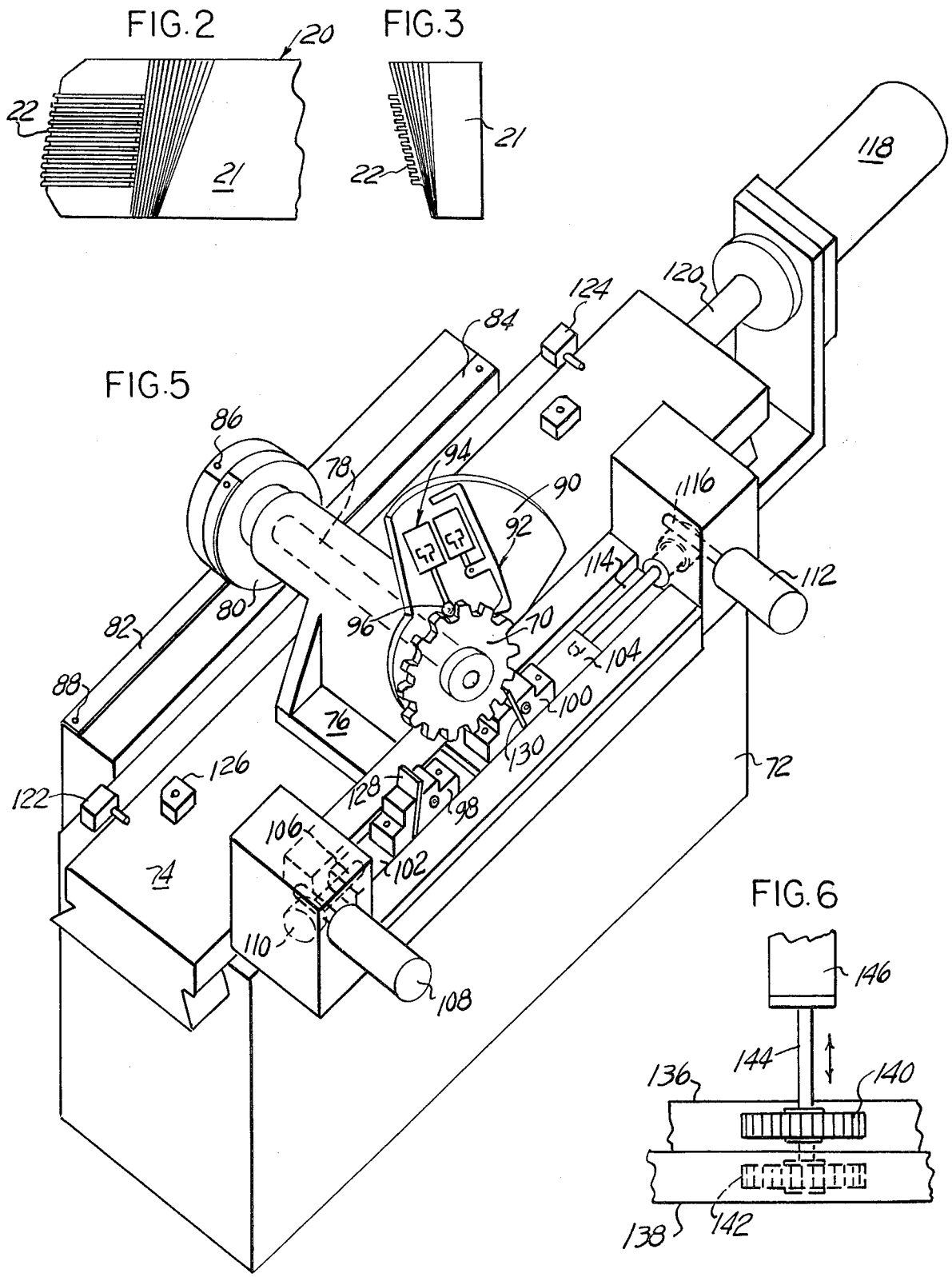

HIGH PRODUCTION SERRATOR

BRIEF SUMMARY OF THE INVENTION

The invention relates to method and apparatus for serrating the flanks of a gear-like tool to be used in cross axes gear shaving. These serrations extend from crest to root of the tooth flanks and intersect the side surface of the teeth in cutting edges which may be acute or obtuse as well understood in the art.

In accordance with the present invention an automatic machine is provided which rolls the gear-like tool blank back and forth relative to one or a plurality of serrating blades. Means are provided for effecting incremental feeding adjustment of the serrating blades intermediate consecutive serrating strokes. In one machine two separate series of blades are provided, each of which during one rolling traverse performs a serrating cut at one side of a plurality of tool teeth. The number of blades may equal the number of teeth in the tool so that during one rolling stroke all of one side of the teeth of the tool are given a serrating cut. On the return stroke the tool blank and a second array of serrating cutters may be relatively adjusted so that during the return stroke the opposite sides of all of the teeth of the tool are given a serrating cut.

PRIOR ART

The art of gear shaving using rotary cutters was developed by Robert S. Drummond, then president of the assignee of the present application, over forty years ago and methods and apparatus for serrating cutters were disclosed in Drummond U.S. Pat. Nos. 2,168,932 and 2,169,632. Subsequently Daniel U.S. Pat. Nos. 3,300,833 and 3,335,639 disclosed further methods of serrating cutters developed by the assignee of the present application.

BRIEF DESCRIPTION OF THE DRAWINGS

FIG. 1 is a fragmentary perspective view showing a few teeth of a serrating gear shaving tool.

FIG. 2 is a front elevation of a serrating blade used for forming serrations in the teeth of a gear shaving cutter.

FIG. 3 is an end view of the blade shown in FIG. 2.

FIG. 5 is a perspective view of a second embodiment of the present invention.

FIG. 6 is a diagrammatic illustration of a modification of the machine illustrated in FIG. 5.

DETAILED DESCRIPTION

Figure 4:
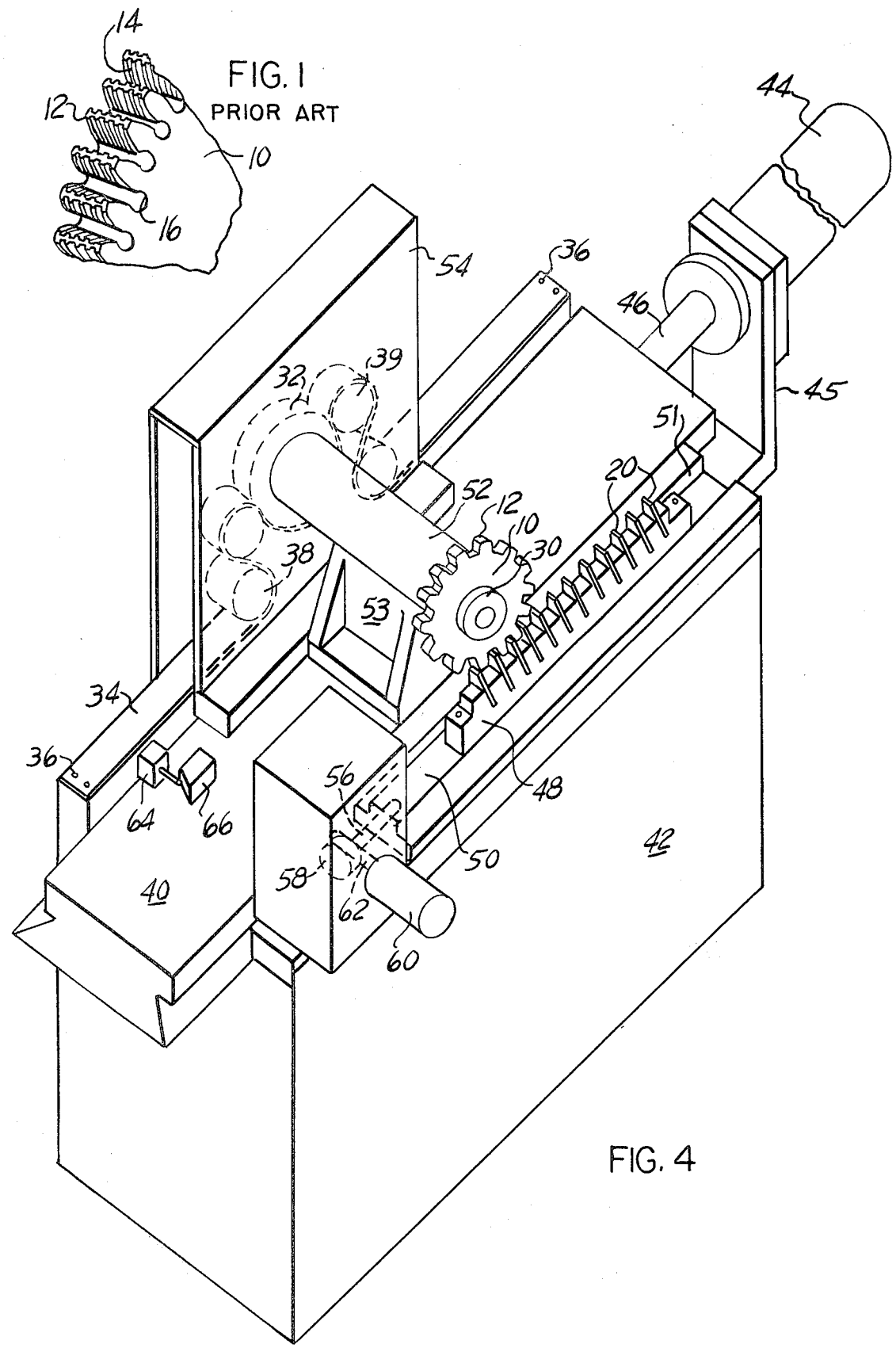
FIG. 4 is a perspective view of one embodiment of the present invention.

Referring first to FIG. 1 the gear shaving tool is in the form of a gear 10 having teeth 12 both sides of which are provided with serrations or grooves as indicated generally at 14. The grooves 14 extend from the crests of the teeth into laterally enlarged openings 16 at the roots of the teeth. These serrations may take the form of grooves having side walls which are parallel to the sides of the shaving tool and if the teeth of the shaving tool are spur, then the intersection between the sides of the serrations and the flanks of the teeth intersect at an included angle of 90° which is a sharp cutting edge capable of removing shavings from the flanks of the teeth of a work gear when rotated in tight mesh with the gear shaving cutter 10, and with the axes of the gear and shaving cutter crossed in space.

Of course the side walls of the serrations may be outwardly inclined at opposite sides of each serration in which case the included angle of the cutting edge produced by the intersection with the surfaces of the teeth of the shaving cutter are obtuse. Alternatively, if the teeth of the gear shaving cutter are helical, the cutting edges or cutters produced by side walls of serrations which are parallel to the sides of the shaving cutter will have respectively acute and obtuse included angles.

The present invention is concerned with the machining of the serrations as illustrated at 14 and for this purpose employs a serrating tool or blade 20 best illustrated in FIGS. 2 and 3. This tool is in effect a blade having a shank 21 and a multiplicity of cutting ribs 22 which are spaced apart as illustrated and are capable of forming the serrations at 14 in the gear shaving tool 10. Instead of forming ribs 22 on a blade portion angularly disposed to a shank 21, the shank 21 may be angularly mounted in supports as described subsequently.

In order for the ends of the ribs 22 of the serrating blade to produce uniform depth serrations, it is essential to provide a generating motion between the gear shaving cutter 10 as illustrated in FIG. 4 and one or more of the serrating blades 20. This generating motion is accomplished by maintaining the shaving cutter 10 on a shaft or spindle 30 having a generating or base roll 32 at its opposite end. Around the roll 32 is provided a flexible tape 34 having its ends anchored as indicated at 36 and which is led around guide and pressure rolls 38 and 39 to cause the tape to engage the underside of the base roll 32 as illustrated in the figure. A slide 40 is provided on a base 42 and is adapted to be reciprocated by suitable means such for example as a piston and cylinder device as indicated at 44 mounted on a bracket 45 fixed to the base 42 and connected by a piston rod 46 to one side of the slide 40. It will be apparent that as the slide 40 is reciprocated by the piston and cylinder device 44, the flexible tape 34 and the base roll 32 cause a rotation of the gear shaving cutter blank 10 equivalent to a rolling motion of the base roll 32 on a planar surface.

The serrating blades 20 are mounted on a block or holder 48 which is fixed to a slide 50 movable longitudinally in ways 51. The cutting ends of the ribs 22 on the serrating blades 20 are positioned relative to the flanks of the tooth surface of the gear shaving cutter blank 10 so that as the cutter blank 10 is rolled along the array of blades, each blade traces an involute path from the crests of the teeth into the enlarged openings 16 at the roots of the teeth.

It is found that the amount of material removed from each serrating step must be quite small and accordingly a multiplicity of cutting strokes are required to produce the necessary depth of the serrations or grooves.

The shaft 30 which carries the shaving tool blank 10 is rotatable in a sleeve 52 fixedly mounted in the support bracket 53 carried by the slide 40. With this arrangement it will be observed that movement of the slide 40 upwardly and to the right as seen in FIG. 4 will cause the shaving tool blank 10 to rotate clockwise and that this rolling motion relative to the serrating blades 20 will cause the blades to take cuts in the grooves or serrations of the teeth 12 from the crest thereof until the cutting edges enter into the laterally enlarged spaces 16 at the roots of the teeth.

It will be observed that the base roll 32 and the guide and pressure rolls 38 are movable with the slide 40 in a housing 54 which is fixed to slide 40, while of course the ends of the tape 34 remain stationary as a result of their attachment at 36 to base 42.

The slide 50 which carries the mounting block 48 carrying the serrating blade 20 is connected by means of a feed screw 56 threaded to one end of the slide 50. The feed screw 56 is driven through a worm and worm gear assembly 58 which in turn is connected to a stepping motor 60 adapted to rotate the shaft 62 by small increments.

Having mounted a tooth shaving tool blank 10 as illustrated in FIG. 4 and having effected preliminary adjustment of the slide 50 so as to position the blades 20 properly to initiate serrating cuts on the teeth 12 during sliding movement of the main slide 40 upwardly and to the right as illustrated, suitable controls are provided for reversing the direction of actuation of the piston and cylinder device 44 as the slide 40 is reciprocated and for effecting intermittent adjustment of the slide 50 which carries the serrating blades 20, such for example as limit switches, one of which is indicated at 64 mounted on the base 42 and switch actuators 66 mounted on the slide 40. These switches are arranged in pairs to be operated at the end of each stroke of reciprocation. At the same time the switches are suitably connected to energize the stepping motor 60 in the proper direction and for the proper movement of steps to accomplish the required adjustment of the serrating blades 20. This adjustment will comprise positioning the blades just prior to initiation of a cutting stroke slightly in advance of the position which they occupy during the serrating cutting stroke. At the same time during the reverse or non-cutting strokes (downward and to the left as seen in FIG. 4), the slides 50 will be adjusted to move the serrating blades into a clearance position. In practice the cut taken by the individual serrating blades may be on the order of 0.001-0.002 inches, and it is contemplated that the number of reciprocations required to complete the serrations will be from ten to twenty.

It will be understood that if gear shaving tool 10 is of relatively coarse pitch, it is possible to provide a number of serrating blades equal to the number of teeth on the shaving cutter 10 and to space these blades apart a distance corresponding to the circular pitch of the teeth 10. With this arrangement each blade operates on a particular tooth of the shaving cutter and when a cycle is completed, all teeth of the shaving cutter 10 will have been serrated to the required depth.

In some cases however, where the shaving cutter 10 is of finer pitch, it is impossible to mount the serrating blades to have a linear pitch equal to the circular pitch of the shaving cutter teeth. In such case the linear pitch of the serrating blades may be two or three times the circular pitch of the shaving cutter teeth and the length of the mounting block 48 correspondingly elongated.

If it is desired to limit the length of the serrating stroke, the operation may be to serrate alternate teeth of the shaving cutter during one operation and then to effect a longitudinal adjustment of the slide 50 to position the blades 20 to perform serrating operations on the remaining teeth 12.

After one side of all of the teeth of the shaving cutter 10 have been serrated, the shaving cutter is removed from the spindle 30 and reversed and the operation repeated to serrate the other side of all of the teeth.

It will be apparent from the foregoing that the operation, except for initial setup and reversal of the shaving cutter 10, may be fully automatic and carried out with relatively great rapidity.

In addition it will be observed that the pattern of serrations of successive teeth may be controlled by the particular location of the ribs 22 on each of the serrating blades 20 as is well understood in the art.

Referring now to FIG. 5 there is illustrated a machine for serrating both sides of one or more teeth of a shaving cutter here designated 70. The machine comprises a base 72 having a main slide 74 provided with a fixed support 76 mounting a shaft 78 for rotation. One end of the shaft is provided with base rolls 80 cooperating with tapes 82 and 84 which as shown are partially wrapped around the base roll 80 and have their ends secured thereto as indicated at 86. The opposite end of the tapes 82, 84, are fixedly secured to the base 72 as indicated at 88.

At the opposite end the shaft 78 is fixedly secured to an index plate 90 having a piston and cylinder or solenoid feed unit 92 and a piston and cylinder or solenoid locater unit 94. In order to index the shaving gear blanks 70 to perform serrating operations on successive teeth, the locater 94 is actuated to withdraw a locating element 96 from between adjacent teeth of the shaving cutter blank 70 after which the index feed unit 92 is actuated to rotate a blank 70 approximately one tooth space. Thereafter the locating unit 94 is actuated to reinsert the ball 96 into the next adjacent tooth space.

In the machine illustrated in FIG. 5, separate blade supporting blocks 98 and 100 are mounted to separate slides 102 and 104 respectively. The block 98 is adjustable by threaded engagement of a screw shaft 106 threaded into one end of the slide 102 which is actuated by a stepping motor 108 through a worm and worm gear connection 110. Stepping motor 112 provides the required adjustment of the block 100 by means of a threaded adjusting screw 114 actuated through a worm and worm gear indicated generally at 116.

Operation of the machine comprises essentially reciprocation of the main slide 74 from a piston and cylinder unit 118 and piston rod 120, with control adjustments being programmed by limit switches 122 and 124 operated by adjustable dogs 126.

In the operation the blades 128 are initially positioned so as to cut on one side of the teeth of the shaving cutter 70 while the blades 130 are positioned to cut during the reverse stroke of the main slide 74 on the opposite side of another tooth.

With the setup as illustrated in FIG. 5 and with a suitable control program to actuate the stepping motors 108 and 112, the locating device 94 and the indexing device 92, and the reverse actuation of the main piston and cylinder unit 118 is proper sequence, the program is started.

During the first stroke of reciprocation, as for example upwardly and to the right as seen in FIG. 5, the blade 130 takes the first serrating cut on the adjacent tooth of the shaving gear 70. Further traverse of the slide 74 causes the blade 128 to approach the opposite side of another tooth of the shaving cutter preparatory to taking the first serrating cut on the opposite side thereof. At the end of the first stroke of reciprocation limit switch 124 is actuated and the main slide 74 is reversed. Stepping motor 112 is actuated in the appropriate direction to retract the slide 104 sufficiently to permit the serrating blade 130 to move in clearance during the reverse stroke. Reverse traverse of the slide 74 brings about engagement between the blade 128 and another tooth of the shaving cutter blank 70 followed by the initiation of a shaving cut from the crest of the tooth to the enlarged space at the root thereof. This stroke is terminated by actuation of the limit switch 122 which again reverses the main piston and cylinder device 118 and makes the appropriate adjustment of the blades 128, 130 by the stepping motors 108 and 112. This involves retraction of the blade 128 into a clearance position for its return or non-cutting stroke and advancement of the blade 130 into a new depth position to take its second serrating cut.

The programming includes means for counting the number of reciprocations of the main slide 74 with the appropriate adjustment of the blades 128 and 130 until the serrations grooves have been cut to full depth. At this time while the slide 74 is in a position in which the shaving cutter blank 70 is in clearance with respect to both blades 128 and 130, the index location device 94 and the indexing device 92 are suitably actuated to index the gear blank 70 to a new position, normally advancing it one tooth.

It will of course be observed that with the apparatus illustrated, a single cycle as just described results in the serration of one side of one tooth of the gear shaving cutter 70 and serration of the other side of another tooth of the shaving cutter blank 70.

After indexing and repeating the cycle as many times as there are teeth in the shaving cutter blank 70, the shaving cutter is completed with all teeth being provided with serrations on both sides.

In the foregoing description a single blade 128 is provided serrating one side of the cutter teeth and a single blade 130 is provided for serrating the other side of the teeth of the shaving cutter 70. Obviously, instead of employing single blades 128, 130, each block 98, 100, may be provided with two or more blades. If two blades are provided on each block and are properly positioned with respect to the location of the teeth of the cutter, all of the teeth of the shaving cutter may be serrated in an operation in which the number of serrating cycles is reduced to one-half, one-third, or the like, depending upon the number of serrated blades. In a proper case these blocks 98, 100, may contain a number of blades equal to the number of teeth on the shaving cutter 70.

An alternate arrangement is suggested in FIG. 6 in which a pair of blade supporting blocks 136, 138, are provided, each of which may be provided with a multiplicity of blades in an arrangement similar to that of the blades 20 seen in FIG. 4. With this arrangement and with the gear shaving cutter blank 140 in the full line position, an operation such as described in conjunction with FIG. 4 may be carried out effectively to serrate one side of all of the teeth of the cutter blank 140. The serrating blades in the other block 138 will be suitably positioned to serrate the other side of all teeth of the shaving cutter 100, 140. Accordingly, means are provided for effecting transfer of the shaving cutter blank 140 from the full line position from which it cooperates with the serrating blade support block 136 to the dotted line position indicated at 142 in which it cooperates with the blades in the other blade supporting block 138. Conveniently this transfer may be accomplished by effecting adjustment of the shaft 144 on which the gear shaving blank 140 is fixedly mounted as indicated by the arrow in FIG. 6.

It will of course be understood that the shaft 144 is rotatable by means similar to the tapes 34 and base roll 32 or the tapes 82, 84, and the base roll 80 as seen in FIG. 5. With this arrangement and with suitable programming to effect proper adjustment of the blade supporting block 136, 138 in timed relation to reciprocation of the slide which carries the spindle 144 and with suitable sequential control of means for effecting axially shifting of the shaft 144 diagrammatically illustrated as a piston and cylinder unit 146, a gear such as 140 may be initially mounted and the blade supporting block 136, 138 suitably adjusted, after which initiation of the operation results in the fully automatic rapid serration of both sides of all teeth of the shaving cutter blank 140 without requiring any attention from the operator.

It will be understood that the cutting ends of the ribs of the serrating blades are located in a plane parallel to the direction of reciprocation of the main slide of the machine and tangentially related to the imaginery base circle of the gear shaving cutter, as determined by the base wall and flexible tape means associated therewith. As a result of this arrangement the ends of the serration cutting ribs will generate involute surfaces which form the bottoms of the serration grooves of the finish gear shaving cutter. This of course insures that the serration grooves are of uniform depth from end to end.

It will further be recognized that where more than one serrating blade is provided to perform a serration cutting operation during rolling advance of a gear shaving cutter in one direction, these blades will be spaced apart a distance equal to the base pitch of the teeth of the gear shaving cutter, or an integral multiplicity thereof.

The use of stepping motors to effect the required adjustment of the blade supports in timed relation to back and forth reciprocation of the main slide permits very rapid and fully flexible controls. Stepping motors are available adapted to perform stepped rotation of an output shaft in either direction for a predetermined and readily programmable number of steps, which are accomplished so rapidly as to be effectively instantaneous so far as operation of the present apparatus is concerned. By the use of these stepping motors each serrating blade can be positioned at a required location to perform a cut upon movement of the slide in one direction, followed by either a very slight retraction of the serrating blade on its idle return stroke, or complete retraction thereof to withdraw the ribs of the blade completely from the partially cut serration grooves on the return or idle stroke. Upon completion of the return or idle stroke, the stepping motors can be reversely actuated for the appropriate number of steps to reposition the serrating blade to take a serrating cut of predetermined depth during the next cutting stroke of the slide.

Moreover, where independently adjustable blade supports are provided, as disclosed in the foregoing, each can be suitably actuated by its own programmed stepping motors so that upon each stroke of reciprocation one or a plurality of multiplicity (up to the number of teeth in the gear shaving cutter) can be performed.

In the foregoing disclosure it will be noted that in FIG. 1 there is illustrated an endless tape frictionally driving a base roll 32 and in FIG. 5 a similar arrangement is illustrated employing separate tapes, ends of which are fixed to the base roll 80. The use of a base roll with one or more tapes is preferred but of course it will be apparent that generally equivalent results could be obtained by rolling a timing gear in tight mesh with a rack.

The machines as described in the foregoing have been designed primarily for the purpose of serrating gear shaving cutters as has been described in the specification. It will be apparent however that the invention may be more broadly described as a gear cutting machine employing one or more blades for effecting cuts from the crest at one side of the tooth to the adjacent space at the root thereof. Reference is made to Bregi, et al U.S. Pat. No. 2,882,798 in which a cutter body is provided in the form of an internal gear, the teeth of which constitute cutting elements having cutting edges at the top corners of the teeth. This patent also suggests the use of inserted blades which are said to correspond to the blades or teeth of the tool 18. This patent in FIGS. 12–18 illustrate the use of cutting blades to produce unmodified gear teeth, gear teeth which are relieved centrally or adjacent the ends, tapered or crowned gear teeth and in FIG. 18 teeth which are serrated to form shaving cutters. It will of course be understood that by the substitution of appropriate blades for the serrating blades illustrated in detail in FIGS. 2 and 3, the apparatus of the present invention may similarly be modified to provide a cutting action over any desired portion of the gear teeth, such cuts originating at the crests thereof and preferably terminating in clearance in circumferentially enlarged openings at the root of the gear teeth.

Briefly reviewed it will be apparent that the apparatus disclosed herein comprises a base on which a work support slide is rectilinearly reciprocable. The slide carries a shaft on which a workpiece is mounted with the axes thereof perpendicular to the direction of reciprocation of the slide. Means effect repeated back and forth reciprocation in a path having a length at least equal to the base circumference of the workpiece, and other means rotate the shaft in accordance with reciprocation so that a workpiece is rotated at least through 360°. An elongated tool holder mounts a multiplicity of blades spaced apart at a distance of the base pitch of work gear teeth, or a multiple thereof, and the teeth are accordingly positioned to take cuts on all, or on equally spaced teeth, of the work gear. At the end of each cutting stroke of the slide, means position the tool holder with its blades in clearance position relative to the gear teeth, and at the end of each idle return stroke of the slide, means reposition the tool holder in a new cutting position to take cuts of predetermined depth on teeth of the workpiece at the following cutting stroke.

I claim:

1. Apparatus for repeatedly and sequentially performing cuts from the crests to the roots of all of the teeth of a gear-like workpiece, comprising a base, a slide on said base, means acting between said base and slide for effecting rectilinear reciprocation of said slide in cutting and idle return strokes in a path having a length at least equal to the base circumference of a workpiece, a rotatable work support shaft on said slide having its axes perpendicular to the path of reciprocation of said slide, means acting between said base and said shaft effective to rotate said shaft in accordance with reciprocation of said slide, an elongated tool holder on said base extending parallel to the path of reciprocation of said slide and having a length at least equal to the base circumference of a workpiece, a multiplicity of cutting blades spaced along said tool holder at a spacing equal to the base pitch of teeth on a workpiece or a multiple thereof, said blades having cutting edges effective to cut from the crest to the root of the workpiece teeth during a cutting stroke, and means operable in timed relation to reciprocation of said slide to adjust said tool holder longitudinally between successive cutting strokes of said slide to position said blade to take a succession of cuts on all of the teeth of a work gear during a succession of cutting strokes.

2. Apparatus as defined in claim 1, comprising means operable in timed relation to reciprocation of said slide to adjust said tool holder longitudinally to position all of the blades thereon in clearance position relative to teeth of a workpiece between completion of a cutting stroke and initiation of an idle return stroke.

3. Apparatus as defined in claim 2, in which the means for adjusting said tool holder comprises a stepping motor, threaded adjusting means connected to said motor, and limit switches actuated at termination of strokes of said slide to control said stepping motor.

4. Apparatus for performing cuts from the crests to the roots at both sides of all teeth of a gear-like work piece, comprising a base, a slide on said base, means for reciprocating said slide on said base; a rotatable shaft on said slide, means for fixedly mounting a gear-like blank on said shaft, means for rotating said shaft is accordance with reciprocation of said slide, limit switch means operable to reverse the direction of reciprocation of said slide at the ends of each stroke of reciprocation, in which said apparatus comprises first and second blade holders independently adjustable on said base in a direction parallel to the direction of reciprocation of said slide, a blade on one holder positioned to take a cut at one side of one tooth during movement of said slide in one direction and a blade on said other holder positioned to take a cut on the other side of one tooth during movement of said slide in the other direction.

5. Apparatus as defined in claim 4, which comprises means under the control of said limit switch means to adjust said second blade holder into non-cutting position while the blade on the first mentioned holder is in cutting position, and into cutting position while the blade on said first mentioned holder is in non-cutting position.

6. Apparatus as defined in claim 5, comprising indexing means under the control of said limit switches connecting the blank to said shaft for actuating after a predetermined number of reciprocations of said slide.

7. A machine for performing cuts on both sides of all teeth of a gear-like blank comprising a base, a main slide, means for reciprocating said slide, a rotatable shaft on said slide perpendicular to the direction of reciprocation of said slide, means for rotating said shaft in timed relation to reciprocation of said slide, a pair of parallel elongated blade holders mounted on said base for adjustment thereon in a direction parallel to the direction of reciprocation of said slide, a multiplicity of blades on one of said holders positioned to cut on one side of the teeth of a blank on said spindle during travel of said slide in one direction, and a multiplicity of blades on the other of said holders positioned to cut on the other side of the teeth of the gear-shaving cutter during travel of said slide in the other direction, limit switches on said base operable to effect reversal of said slide at the end of each reversal of reciprocation, and means under the control of said limit switches to effect longitudinal adjustment of said holders to provide incremental in-feed of said blades for repeated cutting strokes, and to effect relative shifting between said shaft and said holders in timed relation to slide reciprocation to provide for cutting on opposite sides of the teeth of the blank during travel of said slide in opposite directions.

8. Apparatus as defined in claim 7, in which the relative shifting referred to is accomplished by shifting said shaft axially to align the blank carried thereby with one or the other of said blade supports.

9. Apparatus as defined in claim 7, in which the blades on each holder are spaced apart a distance equal to the base pitch of the teeth of the blank, or an integral multiple thereof.

10. A machine as defined in claim 7, in which blank is a gear shaving cutter blank the teeth of which are to be serrated, and said blades have a plurality of ribs with cutting edges at the ends thereof to cut corresponding serrations in the flanks of the teeth of the blank.

* * * * *